March 23, 1926. 1,577,552
S. E. BAILOR
CULTIVATOR
Filed March 5, 1924 4 Sheets-Sheet 4

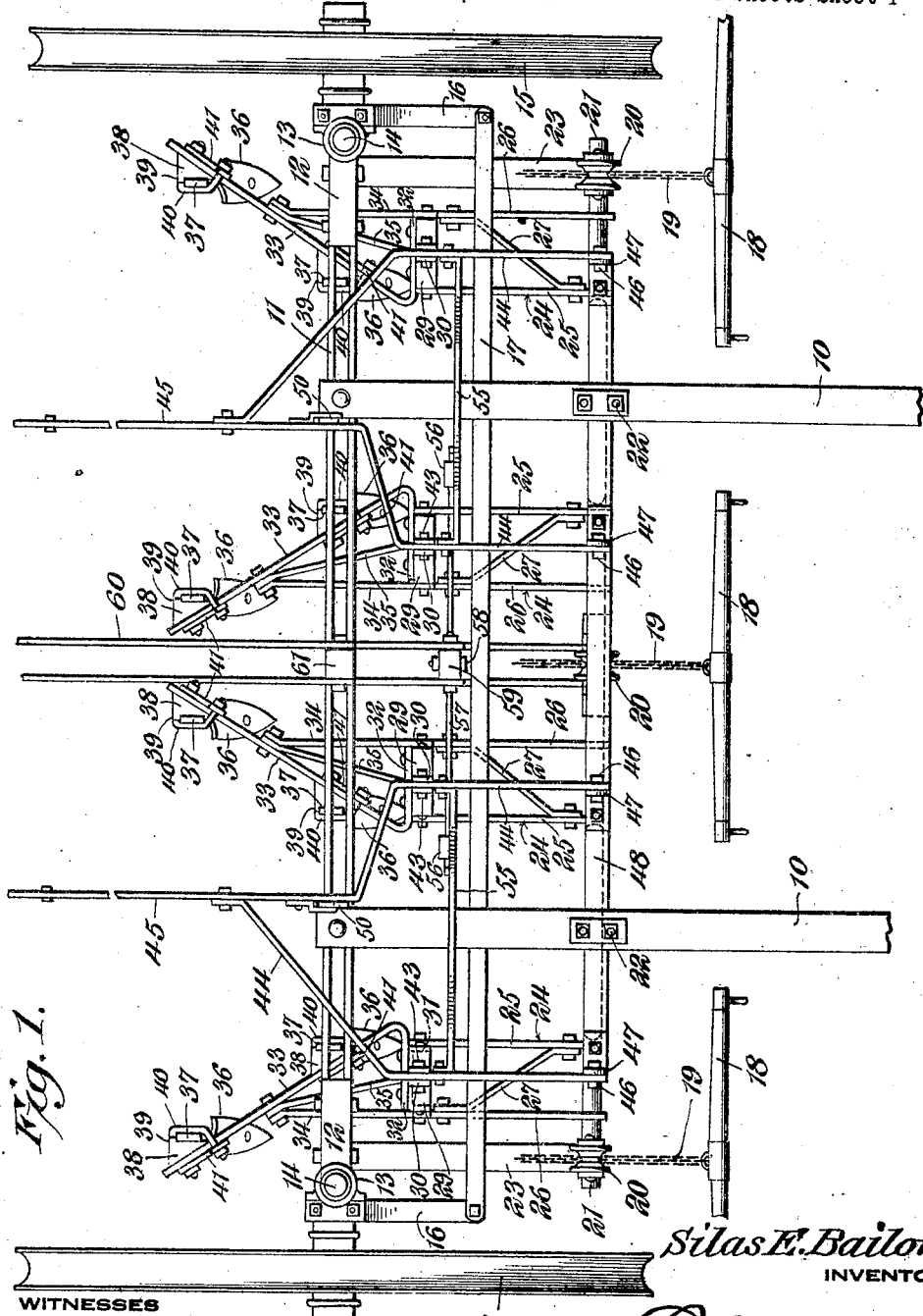

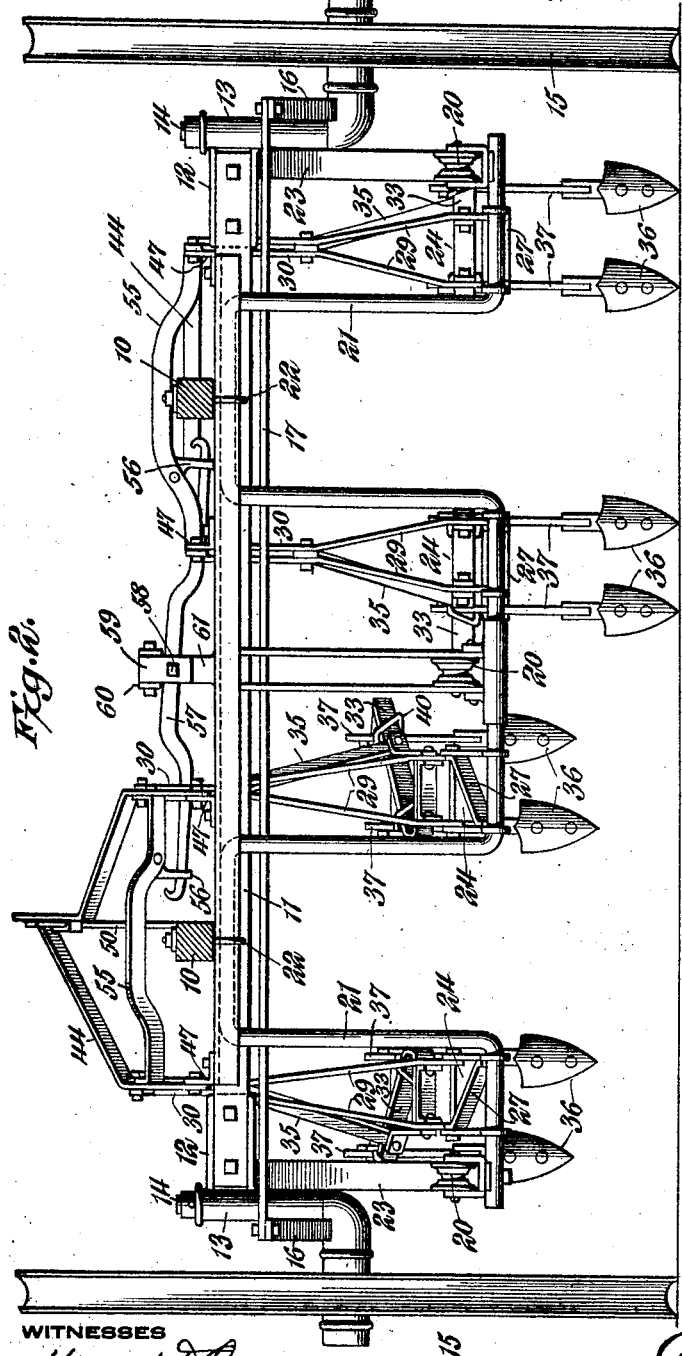

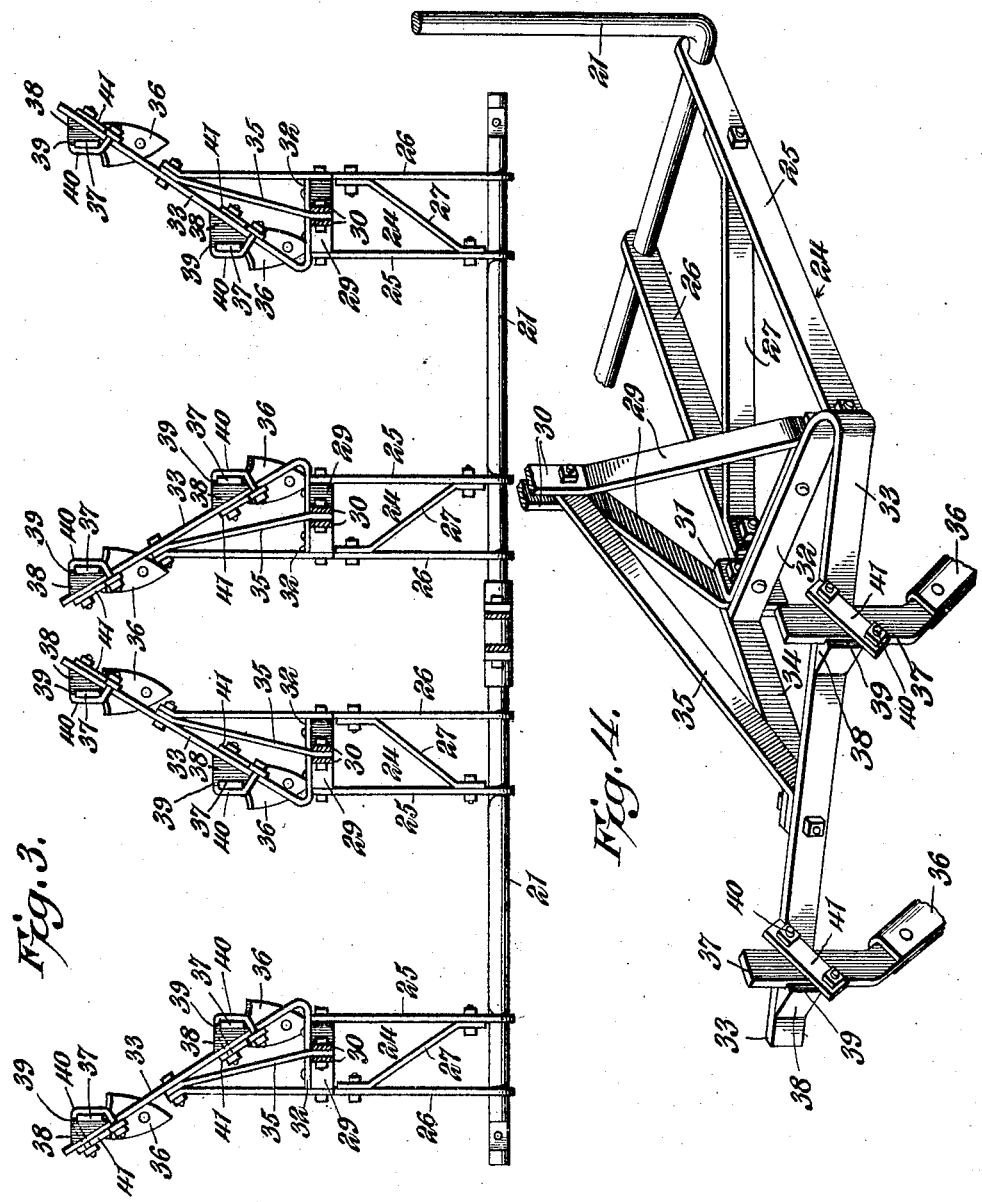

Silas E. Bailor, INVENTOR,

WITNESSES

BY

ATTORNEY

Patented Mar. 23, 1926.

1,577,552

UNITED STATES PATENT OFFICE.

SILAS E. BAILOR, OF ATCHISON, KANSAS.

CULTIVATOR.

Application filed March 5, 1924. Serial No. 697,087.

*To all whom it may concern:*

Be it known that I, SILAS E. BAILOR, a citizen of the United States, residing at Atchison, in the county of Atchison and State of Kansas, have invented a new and useful Cultivator, of which the following is a specification.

This invention relates to cultivators of the same general type as that shown in Patent No. 861,629, issued to me July 30, 1907.

The general object of the present invention is to embody in a cultivator of this type various improvements relating to the mounting of the teeth, and to the structure of the adjustable frame by which the teeth are supported, so as to render the operation of the cultivator more adaptable to the varying conditions under which it may be used.

A more specific object of the invention is to provide improved means for supporting the teeth, whereby they may be raised or lowered simultaneously, while maintaining them at the same depth relative to each other. For this purpose each gang or series of teeth is carried by a substantially horizontal frame, which maintains its horizontal position while it is moved up or down by means of an adjusting lever.

The invention also includes improved means for attaching the teeth to the frame in offset relation to each other, which may also be manipulated to adjust the individual teeth laterally to vary the distance between them, or to adapt the cultivator to plant rows of different widths. An improved arrangement is also provided for mounting pressure springs, which yieldingly urge the teeth into the ground.

With the above and other objects in view, the invention consists in certain details of construction and combinations of elements which will be more particularly described with reference to the accompanying drawings, which illustrate the preferred form of the invention.

In the drawings:

Figure 1 is a plan view of a cultivator embodying my invention.

Figure 2 is a front elevation thereof.

Figure 3 is a horizontal section showing in plan view the adjustable frames for supporting the cultivator teeth.

Figure 4 is a perspective view of one of the adjustable frames.

Figure 7 is a detail sectional view, illustrating the means for clamping the cultivator teeth to the frame.

Figure 8 is a detail perspective view of one of the wedge blocks used in clamping the teeth.

Figure 5:
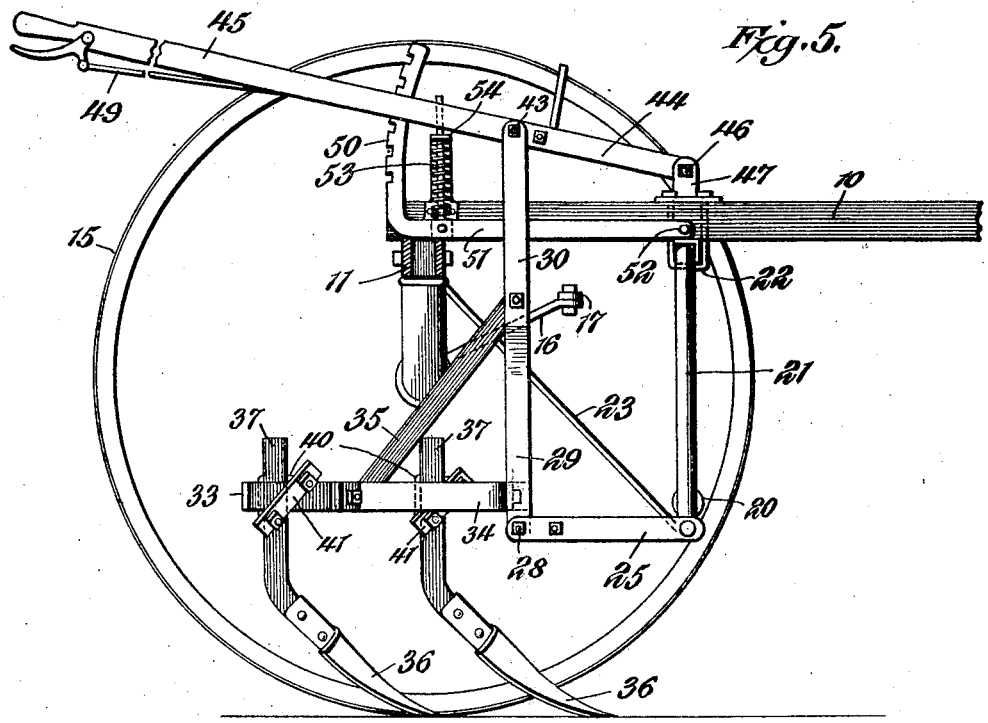
Figure 5 is a side elevation with some of the parts omitted in order to illustrate the invention more clearly.
Figure 6:
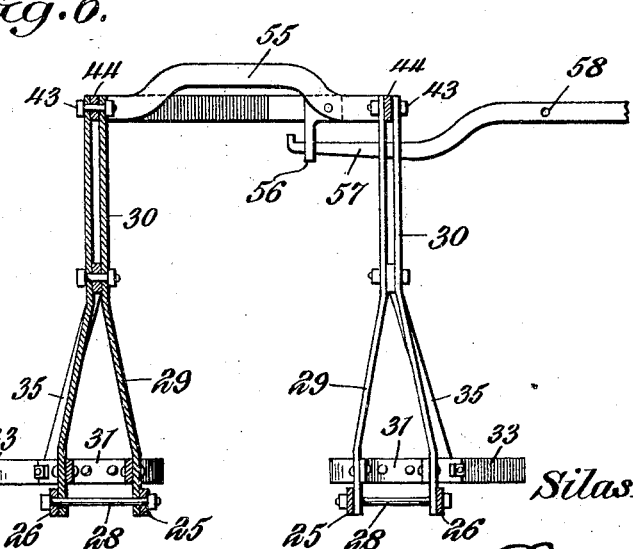
Figure 6 is a vertical transverse section through a portion of the machine, illustrating the means for controlling the height of the adjustable frames which carry the teeth.

As shown in the drawings, the frame of the cultivator has a suitable number of shafts or tongues 10 projecting forwardly for attachment to the draft animals, and secured at their rear ends to a cross bar 11, which may be made of strap iron, or any other suitable material, and which is provided at its ends with brackets 12 having eyes or sockets 13 for receiving the vertical portions of stub shafts 14, which are bent outwardly at their lower ends to form stub axles on which the supporting wheels 15 are mounted. Each of the shafts 14 has a forwardly projecting arm 16 secured thereto, and the forward ends of these arms are connected by a transverse bar 17, which may be operated by any suitable means for controlling the direction of movement of the wheels 15. Suitable whiffle trees 18 are attached to chains 19 which pass around sheaves 20, and may be connected to any portion of the frame. Since the steering mechanism and the draft appliance form no part of the present invention, a detailed description thereof is deemed unnecessary.

The cultivator frame includes an arched bar 21, extending transversely in front of the bar 11 and secured to the tongues 10 by means of U-bolts 22 or the like. The arched bar 21, as shown in Figure 2, is provided with two arches for straddling two rows of plants, and the lower portions of the bar are rigidly braced by bars or rods 23, as shown in Figure 5, and on these lower portions of the bar 21 a plurality of link frames 24 are pivotally mounted, and extend rearwardly therefrom, as best shown in Figures 4 and 5. Each link frame comprises two parallel bars 25 and 26 rigidly braced by a diagonal bar 27, and connected at their rear ends by a bolt 28 to which are pivotally connected the divergent lower end portions 29 of a vertical bar 30, which is moved up and down by means hereinafter described to elevate or lower the cultivator teeth. A bar 31 with inturned ears is secured at its ends to the lower portions 29 of the bar 30 above the rear ends of the link frame 24, and rigidly connected to the bar 31 is a supporting bar 32, having a portion 33 extending rearwardly and laterally in a substantially horizontal plane for supporting the cultivator teeth in offset relation to each other. The rearwardly inclined portion 33 is connected to the bar 31 and to the lower portion 29 of the vertical lifting bar by a brace 34, which braces the tooth supporting bar against lateral movement, while a forwardly and upwardly inclined brace 35 braces it against vertical movement with respect to the lifting bar 30.

Each of the rearwardly and laterally inclined portions 33 of the supporting bars provides a support for a plurality of cultivator teeth 36, which are of the usual construction, extending downwardly and forwardly and provided with vertical shanks 37, which are held in a vertical longitudinal plane by means of substantially triangular-shaped wedge blocks 38, adapted to fit between the shanks and the laterally inclined surface of the bar 33. Each of the wedge blocks 38 is provided with a shoulder 39, which is adapted to engage the rear side of the shank 37, and in this position the shank is clamped to the bar 33 by a suitably shaped U-bolt 40, having its ends connected by a strap 41. As shown in Figure 7, the U-bolt has one leg longer than the other, so as to compensate for the inclination of the wedge 38, and to allow the shank 37 of the tooth to be firmly clamped. By loosening the nuts on the U-bolt 40 any one of the cultivator teeth may be individually adjusted along the bar 33, so as to increase or diminish the spaces between the respective teeth, or to provide a wider space for the plant row.

By means of the construction thus far described, it will be noted that the cultivator teeth are arranged in sets or gangs which are clamped to the rearwardly inclined portions 33 of the supporting frames, which are rigidly connected to the respective vertical bars 30. These frames and the bars 30 are moved up and down for adjusting the depth to which the cultivator teeth penetrate the ground. In order to actuate these bars 30, each bar is pivoted at its upper end, as at 43, to a lever 44, and these levers are arranged in pairs, each pair having a single operating handle 45. The levers are fulcrumed at 46 on ears 47 secured to a transverse bar 48, which is secured to the under sides of the tongues 10, between the same and the arched bar 21. Each handle 45 is provided with a thumb latch, which cooperates with a segment 50 projecting upwardly from a longitudinal bar 51, which is mounted on the side of the tongue 10, and is normally held in the position shown in Figure 5. The levers 44 are nearly parallel to the plane of the link frame 24, and the bars 30 are substantially vertical and lie in a plane parallel to the plane of the arched bar 21, so that as the levers 44 are swung up or down, the levers and the link frames 24 move through substantially equal angles, and the bars 30 always remain in substantially vertical positions with all of the cultivator teeth extending to the same depth into the ground.

It will be noted that the segment bar 51 is mounted for swinging movement about a pivot 52 at its forward end, which pivot is near the fulcrums of the levers 44, so that the latch 49 will properly engage the teeth of the segment 50 in any position of the latter. The segment 50, however, is urged downwardly by a pressure spring 53 mounted in a bracket 54, which is bolted to the tongue. The lower end of the bracket limits the downward movement of the segment 50, while the segment may move upwardly against the resistance of the spring 53. This permits the levers 44 to be adjusted, so that the teeth 36 will normally enter the ground to the desired depth, but permits the levers to move upwardly with the segments 50, thus permitting the cultivator teeth to yield upwardly in case unusual resistance is encountered.

Each pair of levers 44 is transversely connected by a brace bar 55 to which is secured a depending eye 56, which receives the end of a walking beam 57, which is centrally fulcrumed at 58 on a bracket 59 centrally of the machine at the lower end of a seat post 60, which is supported on a post 61 secured to the transverse bar 11. Thus, the weight of the driver assists in effecting the adjustment of the tooth supporting frames, and the walking beam connection between the respective pairs of levers 44 serves to equalize the pressure at opposite sides of the machine.

From the foregoing description it will be seen that I have provided a simple and practical construction, whereby the position of the frames supporting the cultivator teeth may be vertically adjusted without effecting the relative positions of the teeth. Simple means are provided for attaching the teeth to the supporting frame and for individually adjusting them. Although I have shown and described the specific construction of the cultivator to which the invention is applied, it will be readily seen that the same is not limited to the precise structure disclosed, but that various modifications may be made therein, and the invention may be used in connection with different types of cultivators without departing from the salient features of the invention, or from the essential principles thereof as defined by the appended claims.

What is claimed is:

1. In a cultivator, the combination of a main frame, an arched bar, a link frame pivotally mounted on said arched bar and comprising two pivoted parallel bars, a vertical bar pivotally connecting said parallel bars, a supporting bar carrying cultivator teeth rigidly connected to said vertical bar, and means for moving said vertical bar up and down for adjusting the depth of penetration of the teeth carried by said supporting bar, said means including a hand-operated lever connected to said vertical bar, a latching means for said lever, and a spring means for said latching means and said lever, whereby the cultivator teeth are permitted to yield upwardly in the event an unusual obstruction is encountered.

2. In a cultivator, the combination of a main frame, an arched bar, a link frame pivotally mounted on said arched bar and comprising two pivoted parallel bars, a vertical bar pivotally connecting said parallel bars, a supporting bar carrying cultivator teeth rigidly connected to said vertical bar, a lever pivotally connected to the upper end of said vertical bar, a segment mounted for swinging movement below the lever, latching means between said lever and said segment, and spring means for urging the segment downwardly while the latching means is in engagement.

3. In a cultivator, the combination of a main supporting frame, a pair of links pivoted to said frame with their pivotal points one above the other in the same vertical plane, a supporting frame pivotally connected to the links and including a substantially horizontal bar, cultivator teeth secured to said bar, one of said links being prolonged at one end to provide an adjusting lever, and means cooperating with said lever to secure the supporting frame and cultivator teeth in different positions of vertical adjustment, said means being movably connected with the main frame so as to yield upwardly, but positively limited in its downward movement with respect to said main frame.

4. In a cultivator, the combination of a main frame, a pair of links pivoted to the main frame with their pivotal points one above the other in the same vertical plane, a supporting frame pivotally connected to the links and including a substantially horizontal bar, cultivator teeth secured to said bar, one of said links being prolonged beyond the pivotal connection with the supporting frame to provide an adjusting lever, a member pivoted to the main frame adjacent the fulcrum of said lever and having a notched segment substantially concentric with said fulcrum, a latch on the lever cooperating with the notched segment to lock the lever in adjusted position, means positively limiting the movement of the segment member in one direction about its pivot, and yieldable means for resisting movement of the segment in the opposite direction.

5. In a cultivator, the combination of a main frame, a supplemental frame adjustable relatively to the main frame, a lever pivoted to the main frame and movable about its pivot to adjust the supplemental frame, a member pivoted to the main frame adjacent the fulcrum of said lever and having a notched segment substantially concentric with said fulcrum, a latch on the lever cooperating with the notched segment to lock the lever in adjusted position, means positively limiting the movement of the segment member in one direction about its pivot, and yieldable means for resisting movement of the segment member in the opposite direction.

6. In a cultivator, the combination of a main frame, an arched bar secured in rigid and depending relation thereto, a link frame pivoted to the lower portion of the arched bar, a substantially vertical supporting bar pivoted to the link frame, cultivator elements secured in rigid relation to the vertical bar, a lever fulcrumed on the main frame adjacent the arched bar and pivotally connected to the vertical bar for adjusting the cultivator elements vertically, means for latching said lever in its adjusted position, and means for permitting the said lever to move upwardly with the latching means in locked position, thereby permitting the cultivator elements to yield upwardly whenever unusual resistance is encountered.

7. In a cultivator, the combination of a main frame, an arched bar secured thereto, a link frame pivoted to the lower portion of the arched bar, a supporting frame pivoted to the link frame, cultivator elements secured in rigid relation to the supporting frame, a lever fulcrumed on the main frame adjacent the arched bar and pivotally connected to the supporting frame for adjusting the cultivator elements vertically, a member pivoted to the main frame adjacent the fulcrum of said lever and having a notched segment concentric with said fulcrum, a latch on the lever cooperating with the notched segment to lock the lever in adjusted position, means for positively limiting the movement of the segment member in one direction about its pivot, and yieldable means for resisting the movement of the segment member in the opposite direction.

8. In a cultivator, the combination of a main frame, an arched bar secured in rigid and depending relation thereto, a pair of link frames pivoted to the lower portions of the arched bar and adapted to straddle a plant row, a supporting frame pivotally connected to each link frame, a lever fulcrumed on the main frame adjacent the arched bar and having branches pivotally connected to the respective supporting frames, and means for latching the lever to secure both of said supporting frames in vertically adjusted position.

9. In a cultivator, the combination of a main frame, an arched bar secured in rigid relation thereto, a pair of link frames pivoted at one end to the lower portions of the arched bar and extending rearwardly and adapted to straddle a plant row, a substantially vertical supporting bar pivoted to the rear end of each link frame, cultivator elements secured in rigid relation to each vertical bar and with their points in substantially the same horizontal plane, a lever fulcrumed on the main frame adjacent the arched bar and having branches pivotally connected to the respective vertical bars for adjusting the cultivator elements vertically, a member pivoted to the main frame adjacent the fulcrum of said lever and having a notched segment concentric with said fulcrum, a latch on the lever cooperating with the notched segment to lock the lever in adjusted position, means positively limiting the movement of the segment member in one direction about its pivot, and yieldable means for resisting movement of the segment member in the opposite direction.

10. In a cultivator, a wheel supported main frame, a supplemental frame, cultivator elements secured to the supplemental frame, a compound link and lever system pivotally connected to the main frame and supporting said supplemental frame and operable to raise and lower the latter to adjust said cultivator elements vertically without changing their elevation relative to each other, and locking means including a spring for positively limiting the downward movement of the link and lever system and yieldably limiting its upward movement.

11. In a cultivator, a wheel supported main frame, a supplemental frame, cultivator elements secured to the supplemental frame, a compound link and lever system pivotally connected to the main frame and supporting said supplemental frame and operable to raise and lower the latter to adjust said cultivator elements vertically without changing their elevation relative to each other, a member pivoted to the main frame adjacent said link and lever system and having a notched segment projecting upwardly, a latch on the link and lever system cooperating with the notched segment to lock the supplemental frame in its position of vertical adjustment, means positively limiting the movement of the segment member in one direction about its pivot, and yieldable means for resisting the movement of the segment member in the opposite direction.

In testimony that I claim the foregoing as my own, I have hereto affixed my signature.

SILAS E. BAILOR.